United States Patent
Benco et al.

(10) Patent No.: US 7,343,149 B2
(45) Date of Patent: Mar. 11, 2008

(54) NETWORK SUPPORT FOR CREDIT CARD NOTIFICATION

(75) Inventors: David S. Benco, Winfield, IL (US); Sanjeev Mahajan, Naperville, IL (US); Baoling S. Sheen, Naperville, IL (US); Sandra L. True, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 246 days.

(21) Appl. No.: 11/151,674

(22) Filed: Jun. 13, 2005

(65) Prior Publication Data

US 2006/0281439 A1    Dec. 14, 2006

(51) Int. Cl.
*H04M 1/00* (2006.01)

(52) U.S. Cl. .............. 455/406; 455/408; 455/466; 455/414.1; 705/40; 705/39; 705/14; 705/35

(58) Field of Classification Search ............. 455/406, 455/411; 213/701; 235/380, 329; 205/40, 205/35, 14
See application file for complete search history.

(56) References Cited

U.S. PATENT DOCUMENTS

| | | | | |
|---|---|---|---|---|
| 5,459,304 A | * | 10/1995 | Eisenmann | ............ 235/380 |
| 6,394,341 B1 | * | 5/2002 | Makipaa et al. | ............ 235/379 |
| 6,735,572 B2 | * | 5/2004 | Landesmann | ............ 705/14 |
| 2001/0016832 A1 | * | 8/2001 | Chishima | ............ 705/34 |
| 2002/0130176 A1 | * | 9/2002 | Suzuki | ............ 235/380 |
| 2002/0188561 A1 | * | 12/2002 | Schultz | ............ 705/40 |
| 2003/0033272 A1 | * | 2/2003 | Himmel et al. | ............ 707/1 |
| 2003/0119478 A1 | * | 6/2003 | Nagy et al. | ............ 455/408 |
| 2004/0203584 A1 | * | 10/2004 | White | ............ 455/406 |
| 2004/0248554 A1 | * | 12/2004 | Khan et al. | ............ 455/411 |
| 2005/0010505 A1 | * | 1/2005 | Darrell | ............ 705/35 |
| 2005/0033684 A1 | * | 2/2005 | Benedyk et al. | ............ 705/39 |
| 2005/0044410 A1 | * | 2/2005 | Yan | ............ 713/201 |
| 2006/0047835 A1 | * | 3/2006 | Greaux | ............ 709/229 |
| 2007/0027775 A1 | * | 2/2007 | Hwang | ............ 705/26 |

* cited by examiner

*Primary Examiner*—David Q. Nguyen

(57) ABSTRACT

An apparatus in one example has: a network service provider; a mobile terminal operatively coupled to the network service provider; a credit card company system operatively coupled to the network service provider; and the network service provider structured such that, when the credit card company system notifies the network service provider of charges to credit cards associated with the mobile terminal, the network service provider notifies the mobile terminal of such charges.

14 Claims, 4 Drawing Sheets

NETWORK SUPPORT FOR CREDIT CARD NOTIFICATION

TECHNICAL FIELD

The invention relates generally to telecommunication networks, and more particularly to notification of credit card usage.

BACKGROUND

Many people make it a habit to collect credit card receipts throughout their monthly billing period and then compare those receipts with the actual billing statement from the credit card company. However, most people seldom keep a running total so that they know how much they have charged at any point in time during the month. There may be many receipts that must be saved during a month, and many times some of these receipts are lost.

There are other reasons that it may be difficult to track credit card purchases. For example, credit card account holders often have additional cards that they give to children. However, children at times do not have the financial discipline to keep track of how much they have charged. As a result they are often surprised how much they ended up charging during the month. Also, their credit card number may fall into the hands of a criminal and the account holder may not aware of any fraud until the statement comes out at the end of the month.

Thus, there is a need in the art for an improved method of credit card charge notification.

SUMMARY

The invention in one implementation encompasses an apparatus. The apparatus comprises a network service provider; a mobile terminal operatively coupled to the network service provider; a credit card company system operatively coupled to the network service provider; and the network service provider structured such that, when the credit card company system notifies the network service provider of charges to credit cards associated with the mobile terminal, the network service provider notifies the mobile terminal of such charges.

The invention in a further implementation encompasses a method. The method comprises informing, by a charge notification service subscriber (credit card account holder), a network service provider of at least one subscriber's credit card company and at least one subscriber's credit card number that is to be tracked; informing, by the network service provider, the credit card company that the credit card account holder desires to receive charge notification on a mobile terminal of the subscriber; notifying, by the credit card company, the network service provider every time there is a charge to the credit card number; and providing, by the network service provider, charge details of the charge to the credit card to the credit card account holder.

Another implementation of the invention encompasses a method. The method comprises: informing, by a charge notification service subscriber (credit card account holder), a network service provider of at least one subscriber's credit card company and at least one subscriber's credit card number that is to be tracked; informing, by the network service provider, the credit card company that the credit card account holder desires to receive charge notification on a mobile terminal of the subscriber; detecting a credit card charge; determining if a credit card account holder associated with the credit card charge is a charge notification service subscriber; taking no action if the credit card account holder associated with the credit card charge is not a charge notification service subscriber; notifying, by the credit card company when the credit card account holder associated with the credit card charge is a charge notification service subscriber, the network service provider of the charge to the credit card and sending credit card data regarding the charge to the credit card to the network service provider; the network service provider storing the credit card data regarding the charge to the credit card; and the network service provider providing the credit card data regarding the charge to the credit card account holder.

DESCRIPTION OF THE DRAWINGS

Features of exemplary implementations of the invention will become apparent from the description, the claims, and the accompanying drawings in which:

DETAILED DESCRIPTION

Embodiments of the present apparatus and method may provide the cardholder notification of charges as they are happening along with the billing period running balance. Embodiments of the present apparatus and method may also allow the credit card holder to better manage their own spending, as well as, additional credit card holder spending habits to keep their charges under control. It may also provide an opportunity for early detection of fraudulent charges.

Figure 1:
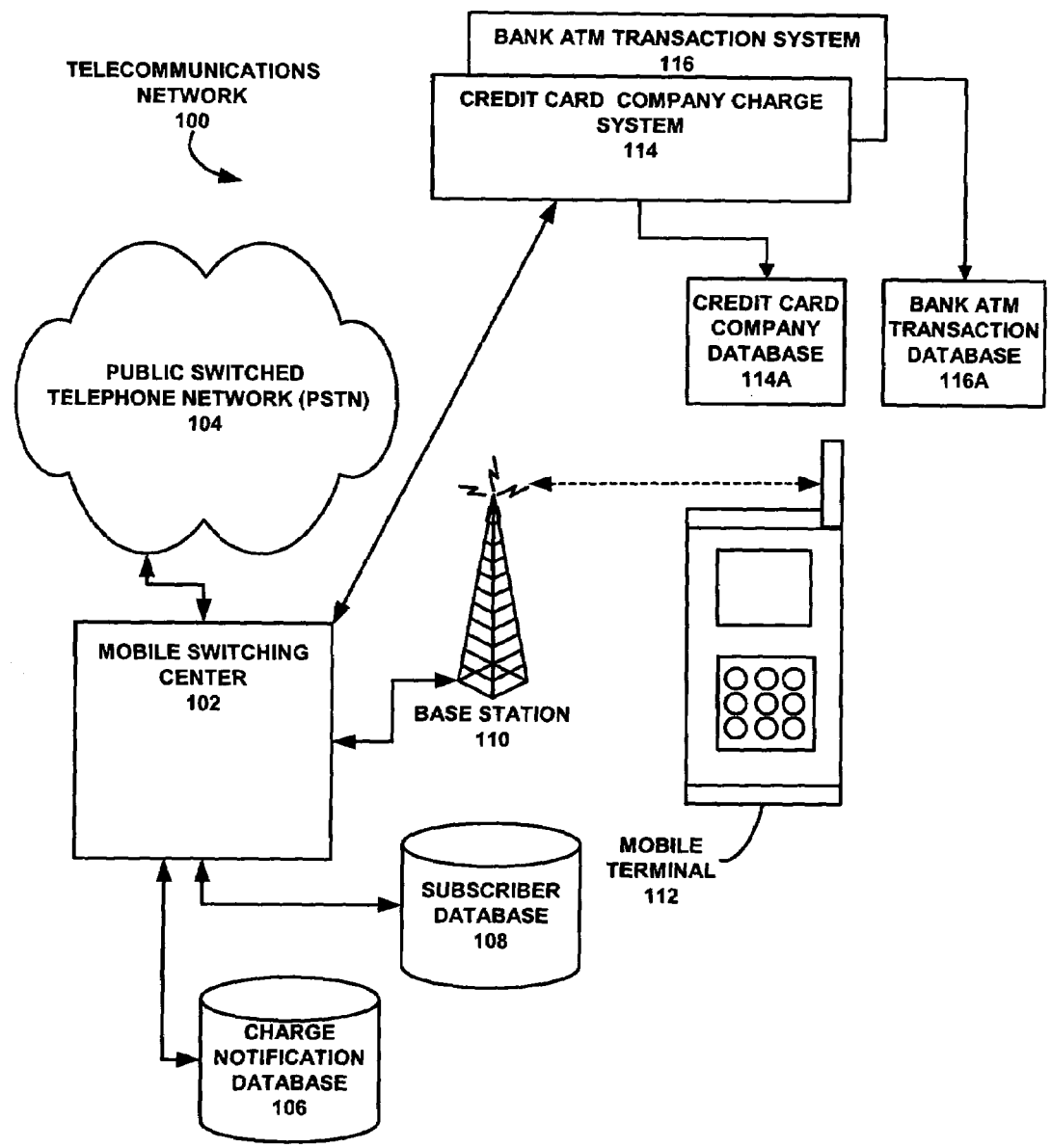
FIG. 1 is a representation of one implementation of an apparatus that provides network support for credit card charge notification.

FIG. 1 is a representation of one implementation of an apparatus that provides network support for credit card charge notification.

A telecommunications network 100 may have a mobile switching center (MSC) 102. The network 100 may be, or may be part of, one or more of a telephone network, a local area network ("LAN"), the Internet, and a wireless network. In the depicted embodiment, a public switched telephone network (PSTN) 104 may be connected to the MSC 102. The PSTN 104 may route calls to and from a mobile terminal 112 through the MSC 102. The MSC 102 may also be connected to at least one base station (BS) 110. The base station 110 communicates with the mobile terminal 112 in its service area using a subscriber database 108. The PSTN 104 generally may be implemented as a worldwide voice telephone network accessible to all those with telephones and access privileges (e.g., AT&T long distance network).

The mobile terminal 112 may be any one of a number of devices, such as a cell phone, a personal data assistant (PDA), a laptop computer, etc.

The mobile switching center 102 may also be operatively coupled to the bank ATM transaction system 116 and the credit card company charge system 114. A credit card company charge system receives and keeps track of all transactions for credit cards issued by the owing agency. These details may be maintained, for example, in the 114A database. Additionally, it also maintains details of the credit card number requiring the charge notification, the service provider and mobile subscriber to be notified. Upon receiving a charge for the credit card requiring notification, the credit card company charge system 114 notifies the service provider of the charge.

The ATM transaction system 116 receives and keeps track of all transactions for the ATM owned by the agency. These details may be maintained, for example, in the 116A database. Upon receiving a withdrawal for a credit card, the ATM transaction system 116 notifies the credit card company about the charge.

The mobile switching center 102 may also be operatively coupled to a charge notification database 106 that stores data regarding credit card purchases. The data may include charge time and date, amount of the charge, business establishment where charge was made, etc.

One methodology of the present apparatus and method may be for the credit card account holder to register with the credit card company and network service provider for credit card charge notification. Another methodology may be for the credit card company to notify the network service provider of any charges to credit cards of mobile users that subscribe to this service. A further methodology may be for the network service provider to notify the mobile subscriber of charges to their account.

Figure 2:
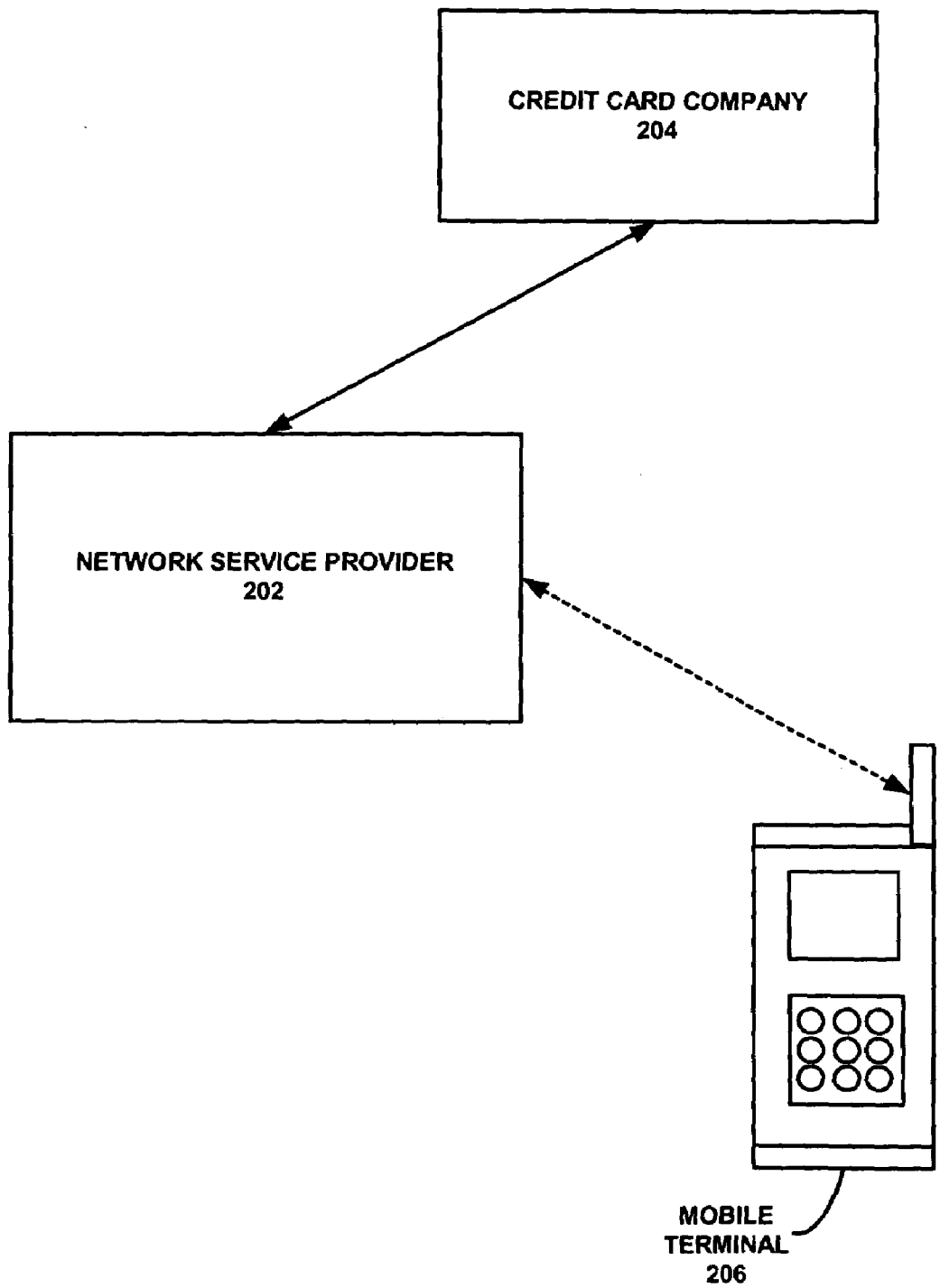
FIG. 2 is another representation of an implementation of an apparatus that provides network support for credit card charge notification.

FIG. 2 is another representation of an implementation of an apparatus that provides network support for credit card charge notification. FIG. 2 depicts a network service provider 202 operatively coupled to a mobile terminal 206 and a credit card company 204.

Figure 3:
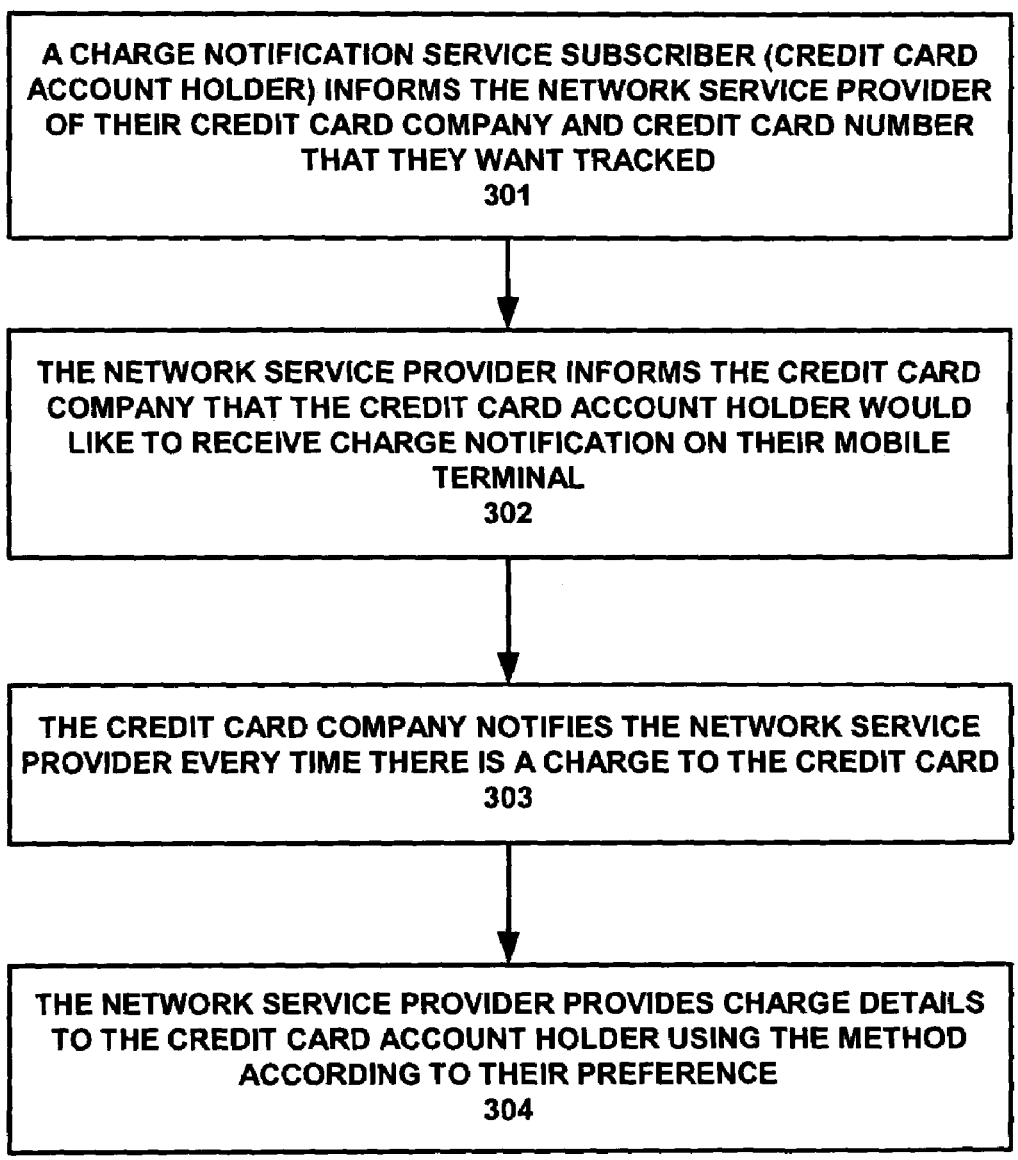
FIG. 3 is a representation of one exemplary flow diagram for notifying a credit card holder any time there is a charge to their credit card according to the present method.

FIG. 3 is a representation of one exemplary flow diagram for notifying a credit card holder any time there is a charge to their credit card according to the present method and used in the FIG. 2 apparatus.

In one embodiment of the present method, a charge notification service subscriber (also referred to as a credit card account holder) (which may be the mobile terminal 206 in FIG. 2) will inform the network service provider (202 in FIG. 2) of their credit card company and credit card number that they want tracked (step 301 in FIG. 3). Of course more than one credit card company and/or credit card number may be communicated to the network service provider.

The network service provider (202 in FIG. 2) will inform the credit card company (204 in FIG. 2) that the credit card account holder would like to receive charge notification on their mobile terminal (206 in FIG. 2) (step 302 in FIG. 3).

Once the charge notification is set up following the above steps, the credit card company (204 in FIG. 2) will notify the network service provider (202 in FIG. 2) every time there is a charge to the credit card number (step 303 in FIG. 3). The notification may include, for example, charge time, amount, business establishment where charge was made, etc. An interface between the credit card company and network service provider may be a secured interface.

The network service provider (202 in FIG. 2) will provide charge details to the credit card account holder using the method according to their preference (step 304 in FIG. 3). The mobile subscriber may receive the notification via voice or SMS on, for example, his/her cell phone (mobile terminal 206 in FIG. 2). Since the phone system is secured, there is no possibility of the notification being delivered to a wrong party.

Figure 4:
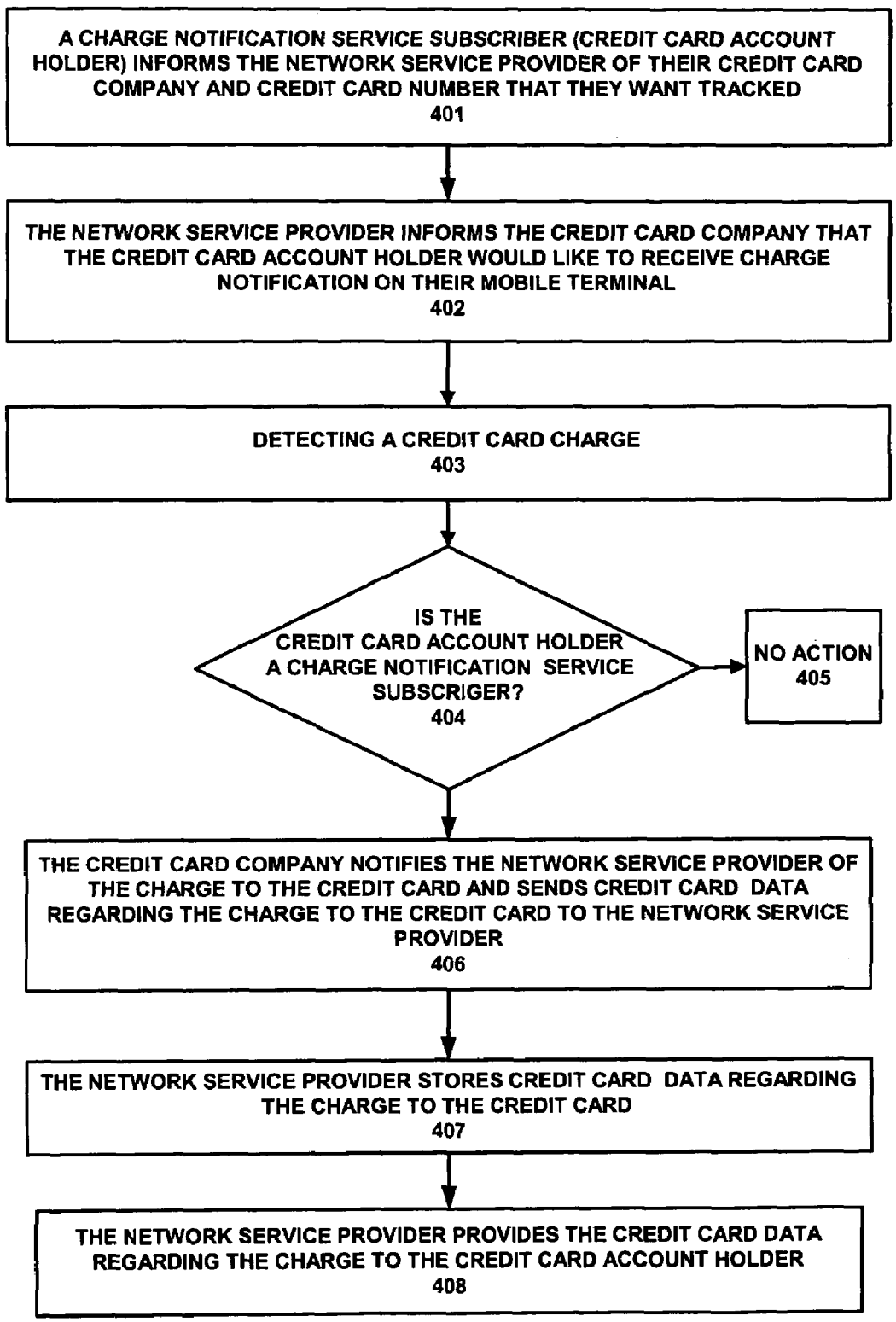
FIG. 4 is another representation of one exemplary flow diagram for notifying a credit card holder any time there is a charge to their credit card according to the present method.

FIG. 4 is a representation of another exemplary flow diagram for credit card charge notification. This method may have the steps of: a charge notification service subscriber (credit card account holder) informs the network service provider of their credit card company and credit card number that they want tracked (401); the network service provider informs the credit card company that the credit card account holder would like to receive charge notification on their mobile terminal (402); detecting a credit card charge (403); check if the credit card account holder is a charge notification service subscriber (404); perform no action if the credit card holder is not a charge notification service subscriber (405); the credit card company notifies the network service provider of the charge to the credit card and sends credit card data regarding the charge to the credit card to the network service provider, if the credit card holder is a charge notification service subscriber (406); the network service provider stores credit card data regarding the charge to the credit card (407); and the network service provider provides the credit card data regarding the charge to the credit card account holder (408).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a network service provider;
    a mobile terminal operatively coupled to the network service provider;
    a credit card company system operatively coupled to the network service provider; and
    the network service provider structured such that, when the credit card company system notifies the network service provider of charges to credit cards associated with the mobile terminal, the network service provider notifies the mobile terminal of such charges, wherein the network service provider is also structured such that upon detecting a credit card charge the network service provider determines if a credit card account holder associated with the credit card charge is a charge notification service subscriber, and takes no action if the credit card account holder associate with the credit card charge is not a charge notification service subscriber, the network service provider storing credit card data regarding the charge to the credit card.

2. The apparatus according to claim 1, wherein when the network service provider notifies the mobile terminal of charges, the network service provider sends credit card data to the mobile terminal, and wherein the credit card data comprises at least charge time and date, amount of the charge, and business establishment where charge was made.

3. The apparatus according to claim 1, wherein the mobile terminal is a cell phone.

4. The apparatus according to claim 1, wherein the mobile terminal is a cell phone, and wherein the network service provider sends credit card data indicative of the charges to the cell phone via one of voice or SMS (short message service).

5. The apparatus according to claim 1, wherein the network service provider has a mobile switching center that has a subscriber database and a charge notification database.

6. The apparatus according to claim 5, wherein credit card company system has a bank ATM database and a credit card company database.

7. The apparatus according to claim 5, wherein the credit card company system securely interfaces with the mobile switching center.

8. A method, comprising:
informing, by a charge notification service subscriber (credit curd account holder), a network service provider of at least one subscriber's credit card company and at least one subscriber's credit card number that is to be tracked;
informing, by the network service provider, the credit card company that the credit card account holder desires to receive charge notification on a mobile terminal of the subscriber;
detecting a credit card charge;
determining if a credit card account holder associated with the credit card charge is a charge notification service subscriber;
taking no action if the credit card account holder associated with the credit card charge is not a charge notification service subscriber;
notifying, by the credit card company when the credit card account holder associated with the credit card charge is a charge notification service subscriber, the network service provider of the charge to the credit card and sending credit card data regarding the charge to the credit card to the network service provider;
the network service provider stores credit card data regarding the charge to the credit card; and
the network service provider provides the credit card data regarding the charge to the credit card account holder.

9. The method according to claim 8, wherein the charge notification service subscriber informs the network service provider of a plurality of credit card companies and credit card numbers that are to be tracked.

10. The method according to claim 8, wherein, the credit card company notifies the network service provider of each charge to the credit card and sends credit card data regarding the charge to the credit card to the network service provider every time a charge is made to the credit card.

11. The method according to claim 8, wherein the charge notification service subscriber communicates with the network service provider over a secure interface.

12. The method according to claim 8, wherein the network service provider sends the credit card data to a mobile terminal of the credit card account holder via one of voice or SMS (short message service).

13. The method according to claim 12, wherein the mobile terminal is a cell phone.

14. The method according to claim 8, wherein charge notification is provided to the subscriber on one of a subscription basis and a per use basis.

* * * * *